US008856661B2

(12) United States Patent
Kim et al.

(10) Patent No.: US 8,856,661 B2
(45) Date of Patent: Oct. 7, 2014

(54) METHOD AND SYSTEM FOR SHARING INFORMATION ON IMAGE DATA EDITED BY EDITING APPLICATIONS

(75) Inventors: Yeon Jeng Kim, Seoul (KR); Jin Kyoung Kim, Gyeonggi-do (KR); HeungKi Yun, Gyeonggi-do (KR); Je Eon Jeon, Seoul (KR)

(73) Assignee: NHN Corporation, Seongnam-si (KR)

( * ) Notice: Subject to any disclaimer, the term of this patent is extended or adjusted under 35 U.S.C. 154(b) by 1091 days.

(21) Appl. No.: 12/167,331

(22) Filed: Jul. 3, 2008

(65) Prior Publication Data
US 2009/0013036 A1 Jan. 8, 2009

(30) Foreign Application Priority Data

Jul. 6, 2007 (KR) ........................ 10-2007-0068277

(51) Int. Cl.
*G06F 3/00* (2006.01)
*G06T 11/60* (2006.01)
(52) U.S. Cl.
CPC ............. *G06T 11/60* (2013.01); *G06T 2200/16* (2013.01)
USPC ............ 715/751; 715/724; 715/747; 715/748
(58) Field of Classification Search
USPC .......... 715/838, 210, 255, 724, 747, 748, 751
See application file for complete search history.

(56) References Cited

U.S. PATENT DOCUMENTS

| 6,333,752 | B1 * | 12/2001 | Hasegawa et al. | 715/764 |
|---|---|---|---|---|
| 6,527,812 | B1 * | 3/2003 | Bradstreet | 715/210 |
| 6,590,584 | B1 * | 7/2003 | Yamaura et al. | 715/704 |
| 7,062,497 | B2 * | 6/2006 | Hamburg et al. | 1/1 |
| 7,441,182 | B2 * | 10/2008 | Beilinson et al. | 715/229 |
| 7,546,539 | B2 * | 6/2009 | Kibilov et al. | 715/760 |
| 7,668,873 | B2 * | 2/2010 | Davis et al. | 707/802 |
| 7,900,142 | B2 * | 3/2011 | Baer | 715/255 |
| 7,974,948 | B2 * | 7/2011 | Baer et al. | 707/638 |
| 2008/0040588 | A1 * | 2/2008 | Ukigawa et al. | 712/228 |

FOREIGN PATENT DOCUMENTS

| JP | 63-082553 | 4/1988 |
|---|---|---|
| JP | 2002-368936 | 12/2002 |
| JP | 2005-165385 | 6/2005 |
| KR | 1020050099295 | 10/2005 |
| KR | 2007-013896 | 1/2007 |

OTHER PUBLICATIONS

Andy Anderson, Adobe Photoshop CS3 on Demand (published on May 1, 2007).*

(Continued)

*Primary Examiner* — Amy Ng
*Assistant Examiner* — Di Xiao
(74) *Attorney, Agent, or Firm* — Greer Burns & Crain, Ltd.

(57) ABSTRACT

An editing method includes the steps of: providing a plurality of editing applications to a user terminal over a network, each of the editing applications allowing a user of the network to modify an image; in response to the user's request, performing at least one editing operation on the image by using a first editing application; storing an editing list in a storage area, the editing list embodying the at least one editing operation; and applying at least a portion of the stored editing list to the image to modify the image such that the user can apply previous editing operations embodied in the stored editing list to the image when the user edits the image by using a second editing application.

26 Claims, 8 Drawing Sheets

(56) References Cited

OTHER PUBLICATIONS

Richard Lynch, the Hidden power of Photoshop Elements (2005), http://hiddenelements.com/actions_whitepaper.html.*

Robert J. Shimonski, Using Remote Desktop with Windows XP Professional (Dec. 7, 2004), http://www.windowsnetworking.com/articles_tutorials/using-remote-desktop-windows-xp-pro.html.*
Japanese Office Action issued on Oct. 26, 2010.

* cited by examiner

METHOD AND SYSTEM FOR SHARING INFORMATION ON IMAGE DATA EDITED BY EDITING APPLICATIONS

CROSS-REFERENCE TO RELATED APPLICATION

This application claims the benefit of Korean Patent Application No. 10-2007-0068277, filed on Jul. 6, 2007, in the Korean Intellectual Property Office, the disclosure of which is incorporated herein by reference in its entirety for all purpose.

FIELD OF THE INVENTION

The present invention relates to a method and system for enabling a user to edit image included in content more conveniently during a process of creating the content on a web page over a network; and more particularly, to the method and the system not only for sharing information on the image edited by an editing application with other editing applications but also for effectively managing the edited image in a web service which provides a variety of editing applications for helping the user to edit the image.

BACKGROUND OF THE INVENTION

Recently, as the internet use is generalized, the amount of contents distributed by content distributors such as online portal sites or internet service providers is sharply increasing. More users are creating and providing contents personally in an active way rather than only obtaining information passively from the content distributors. In other words, online contents, including web documents, news articles, images, videos, and media information, which had been offered only by online portal sites in the past have been recently actively produced and distributed by the users. This trend becomes stronger thanks to the boom of the user created contents (UCCs) as well as the boost of blog sites or homepage sites (hereinafter referred to as "service providers") which provide a variety of functions for the users to create contents more easily and conveniently.

In general, such UCCs are made not only with the data in a form of text prepared by the users but also with image information (hereinafter referred to as "image") such as images and videos which exists in a user terminal or on the network. To this end, the service providers provide a variety of editing applications with which the users can modify the image. The service providers not only provide a function to perform the editing operation during the process of uploading the image to be included in the contents to a server thereof by interlocking the editing applications with a web browser but also offer a function for the user to select and use one of the multiple editing applications which may have different functions. For example, FIG. 1 is a drawing illustrating the web browser on which the above-mentioned image editing applications are provided. The user can select one of three editing applications which are included in an editing application selecting area 101 of FIG. 1. By referring to FIG. 1, it may be found that the user can select an editing application called "Use Image Tool" among the three editing applications and edit the image by using the editing application called "Use Image Tool".

However, the conventional technology has several following drawbacks: First of all, the editing information cannot be shared among the editing applications. In other words, as shown in FIG. 1, if the user desires to perform the editing operation on the image by using another editing application included in the editing application selecting area 101 while the user uses a certain editing application included in the editing application selecting area 101 to register the image data to be added in a content and to perform the editing operation to the registered image data, there is a demerit in that the registration of the image data the user carried out and all the editing operations for the registered image data can be cancelled, and thus, the user must newly perform all the editing operations previously conducted as well as the registration of the image data previously conducted in order to edit the image by using other editing application.

Furthermore, according to the conventional technology, it has a drawback in that if the user desires to cancel a certain editing operation while editing the image, it requires troublesome work. For instance, if a user needs to cancel an editing operation of "rotation" after execution of a series of editing operations for image, e.g., "move," "rotation," "achromatic color," and "mosaic" in such order of the execution, the user would need to cancel several latest editing operations, i.e., "mosaic" and "achromatic color" prior to the operation of "rotation" in a reverse order of the execution. Further, the canceled editing operations of "mosaic" and "achromatic color" need to be re-executed after the operation of "rotation" is canceled to resume the previous editing operations except for the cancelled operation of "rotation".

Thus, there is a need for an improved method and system for editing image and the like to avoid redundant or repetitious tasks. Accordingly, the present invention is directed to overcoming one or more of the problems as set forth above.

SUMMARY OF THE INVENTION

It is, therefore, an object of the present invention to provide a method and system not only for sharing information on editing operations conducted by multiple editing applications in order to apply various editing functions provided by the editing applications to a content but also for modifying or canceling a certain editing operation by accessing directly thereto by managing all the editing operations performed to the image effectively to thereby make the user create a variety of contents more easily.

In accordance with one aspect of the present invention, there is provided a method including the steps of: providing a plurality of editing applications to a user terminal over a network, each of the editing applications allowing a user of the network to modify an image; in response to the user's request, performing at least one editing operation on the image by using a first editing application; storing an editing list in a storage area, the editing list embodying the at least one editing operation; and applying at least a portion of the stored editing list to the image to modify the image such that the user can apply previous editing operations embodied in the stored editing list to the image when the user edits the image by using a second editing application. The user can select and perform a plurality of editing applications to modify an image. The user can switch to a second editing application while the user modifies the image by using a first editing application. Further, the editing list can embodies a plurality of editing operations by using more than one editing applications. The user is allowed to access the stored editing list for the first editing application while the user is using the second editing application. The editing list can be stored either in a remote server over the network or in the user terminal.

In accordance with another aspect of the present invention, there is provided a system for editing image including: a first storage section for storing at least one image; an editing function providing part adapted for providing a plurality of editing applications to a user terminal over a network, each of the editing applications allowing a user of the network to modify an image; a second storage section for storing an editing list in a storage area, the editing list embodying the at least one editing operation; and an image data converting part adapted for applying at least a portion of the stored editing list to the image to modify the image such that the user can apply previous editing operations embodied in the stored editing list to the image when the user edits the image by using a second editing application.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF PREFERRED EMBODIMENTS

Figure 1:
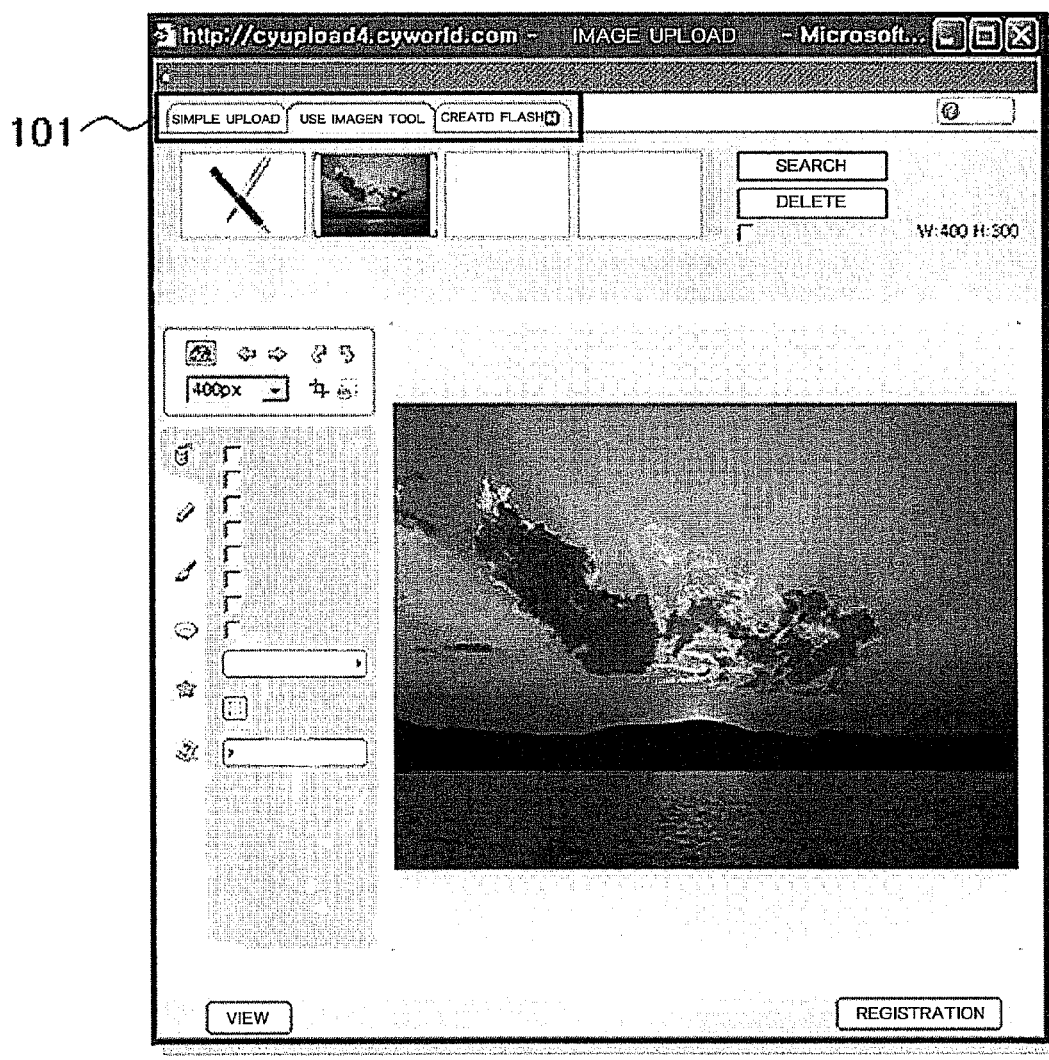
FIG. 1 refers to a conventional technology which provides a function to edit image.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are described below in detail.

The Configuration of the Whole System

Figure 2:
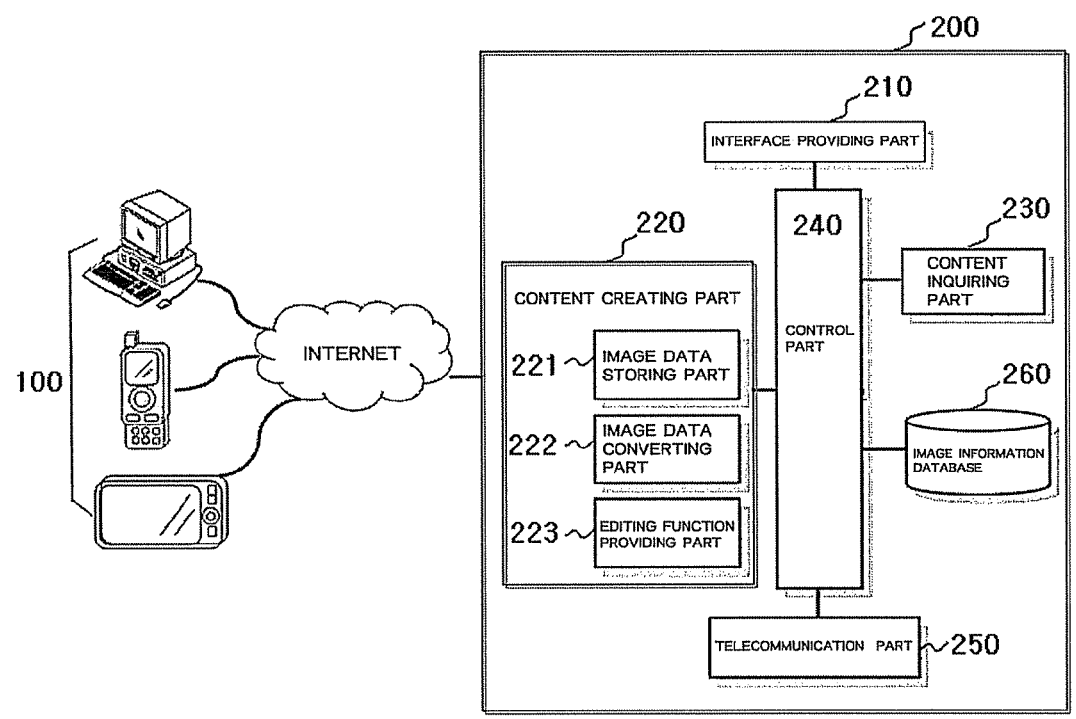
FIG. 2 illustrates the configuration of the whole system for editing image in accordance with the present invention.

FIG. 2 illustrates a configuration of a system for creating contents which contain image in accordance with the present invention.

A user terminal 100 available in the system of FIG. 2 can include a variety of digital devices, e.g., a personal computer, mobile phone, PDA, PMP and other wired or wireless digital devices accessible to the internet.

The terminal 100 creates, inquires and modifies contents by accessing the service server 200. To achieve this goal, as shown in FIG. 2, the service server 200 can include an interface providing part 210, a content creating part 220, a content inquiring part 230, a control part 240 and a telecommunication part 250.

In accordance with one example embodiment of the present invention, at least part of the interface providing part 210, the content creating part 220, the content inquiring part 230, the control part 240 and the telecommunication part 250 can be included in the service server 200 or can be program modules communicating with the service server 200. However, FIG. 2 shows exemplary configuration of the service server 200 including the interface providing part 210, the content creating part 220, the content inquiring part 230, the control part 240 and the telecommunication part 250. The program modules are included in the service server with a form of OS, application program module, or other types of program modules and recorded in a plurality of well-known memory units. Moreover, the program modules are recorded in remote controllable memory units capable of communicating with the service server. The program modules include routine, subroutine, program, object, component, data structure and the like capable of executing specific tasks which will be explained in this specification, but not confined thereto.

In concrete, when the user wants to access the service server 200 to create, inquire and modify content, the interface providing part 210 provides a user interface (e.g. GUI) appropriate to the terminal 100.

In addition, when the user wants to access the service server 200 to create the content, the content creating part 220 receives information related to text data and image inputted by the user and then stores it. In accordance with the present invention, the content creating part 220 includes an image data storing part 221, an image data converting part 222 and an editing function providing part 223 for the storage and the edition of the image.

The image data storing part 221 stores information on the image received from the user terminal 100 in the service server 200. In this regard, the service server 200 includes an image information database 260 for storing information on the image. The information on the image transferred to the service server 200 at the time when the user finishes creating the content is stored in the image information database 260 but temporary information on the image transferred to the service server 200 before the user finishes creating the content can be stored as well. In one embodiment, the text data inputted while the user creates the content are stored. Herein, the information on the image has the concept inclusive of not only the image themselves but also the information required to display the image on a screen of the terminal 100.

When the user edits the image by using the editing application(s) provided by the editing function providing part 223, the image data converting part 222 modifies the existing information on the image stored in the service server 200 by referring to the editing information.

The editing function providing part 223 edits the image to be included in the content. At the time, the editing function providing part 223 provides the editing applications including a variety of editing functions to the terminal 100. As mentioned above, there may be multiple editing applications, and it is possible to choose one among them to edit the image.

In accordance with the present invention, the editing application does not have to be provided to or installed in the user terminal as an independent program. For example, even if the editing application which exists in the service server 200 is used temporarily through the interface providing part 210 while the user is editing the image, it falls under the editing application of the present invention.

Moreover, the content inquiring part 230 performs the function to receive the request of the user's inquiry on the content stored in the service server 200 and offer the requested content to the user terminal 100.

Furthermore, the control part 240 performs the function of controlling the data flow among the interface providing part 210, the content creating part 220, the content inquiring part 230, and the telecommunication part 250. In other words, the control part 240 enables the interface providing part 210, the content creating part 220, the content inquiring part 230, and the telecommunication part 250 to perform their unique functions by controlling the signal transmitted and received among the above-mentioned modules.

Lastly, the telecommunication part 250 plays a role in transmitting/receiving data to/from the user terminal 100 or other devices connected with the service server 200 through the network.

In the meantime, a variety of databases mentioned in the present invention may include database(s) in a narrow sense as well as database(s) in a broad sense including data record based on a file system. Further, the variety of databases in the present invention may contain a set of simple logs if the logs can be retrieved and extracted.

Sharing the Image Among the Editing Applications

The user can add specific image to content by designating the path of the specific image while creating the content. The specific image to be included in the content can be stored in the user terminal 100 or in the service server 200 over a network. To this end, the interface providing part 210 provides the function to designate the path of the specific image to the terminal 100. For example, in case the images are stored in the terminal 100, the path of the image is designated by specifying the image stored in a file system of the terminal 100; and in case the images are stored on the network, the network address of the image such as URL is inputted.

If the user specifies the path of the image, the corresponding image are transferred to the service server 200 and the image data storing part 221 would receive the image and store them in the service server 200.

In other words, since the image are stored in the service server 200 at the time when the image to be included in the content are specified by the user, the successive editing operation is performed based on the image stored in the service server 200.

Figure 3A:
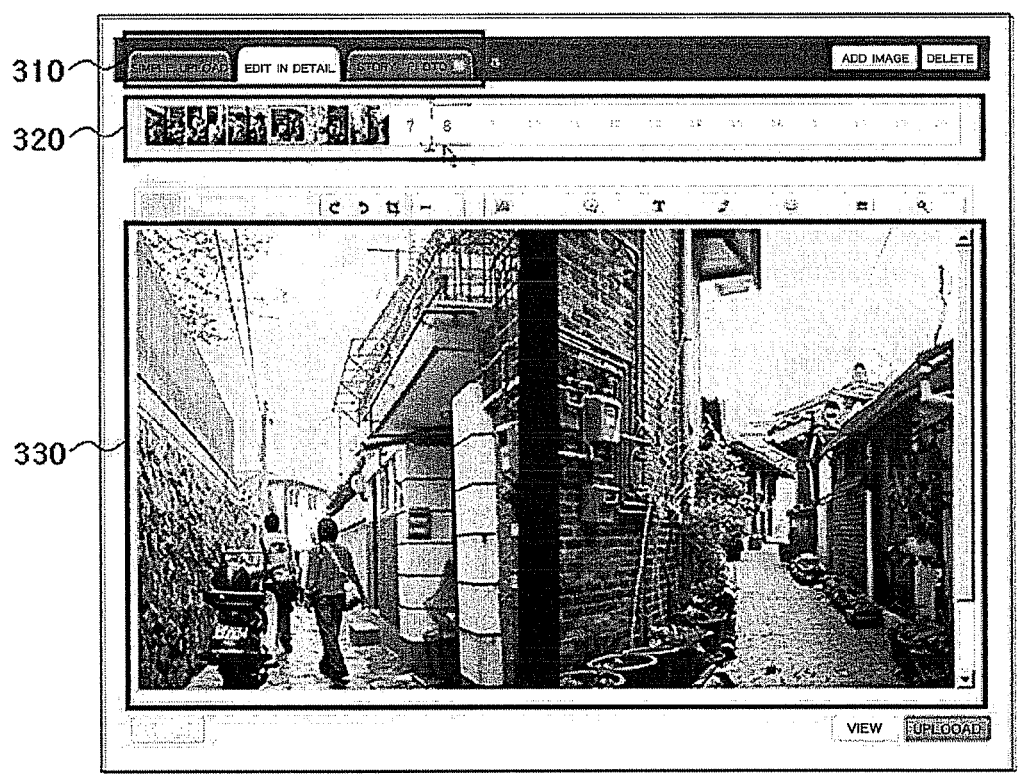
FIG. 3A and FIG. 3B show that the information on the image is maintained on a screen even after an editing application is converted into another editing application.

FIG. 3A illustrates that editing applications are provided to the terminal 100 for enabling the user to edit the image after the user adds the image to create content.

By referring to FIG. 3A, it should be noted that the user selects a specific editing application called "Edit in detail" among the three editing applications provided to a selecting area 310 to perform editing one or more operations by using the specific editing application and the whole or a part of the list of the image added by the user is provided in a thumbnail form to a image data list displaying area 320 and a content creating process displaying area 330.

If the user converts the editing application called "Edit in detail" into another editing application called, e.g., "Story Photo" included in the editing application selecting area 310, the service server 200 transmits the user interface associated with the editing application called "Story Photo" to the terminal 100 and acquires a list of the image added by using the editing application called "Edit in detail" in order to display them on the user interface associated with the editing application called "Story Photo", i.e., the image data list displaying area 320 and the content creating process displaying area 330 by referring to the image information database 260 of the service server 200.

In accordance with the present invention, even when the user changes the editing application during the editing operation, the user can add a variety of editing effects while keeping the information on the image having been added to the content. In comparison, according to the conventional technology, when the user changes the editing application as mentioned above, the image having been added to the content were not maintained. Therefore, the present invention will solve the inconvenience of the conventional technology and contribute to the creation of a variety of contents.

Figure 3B:
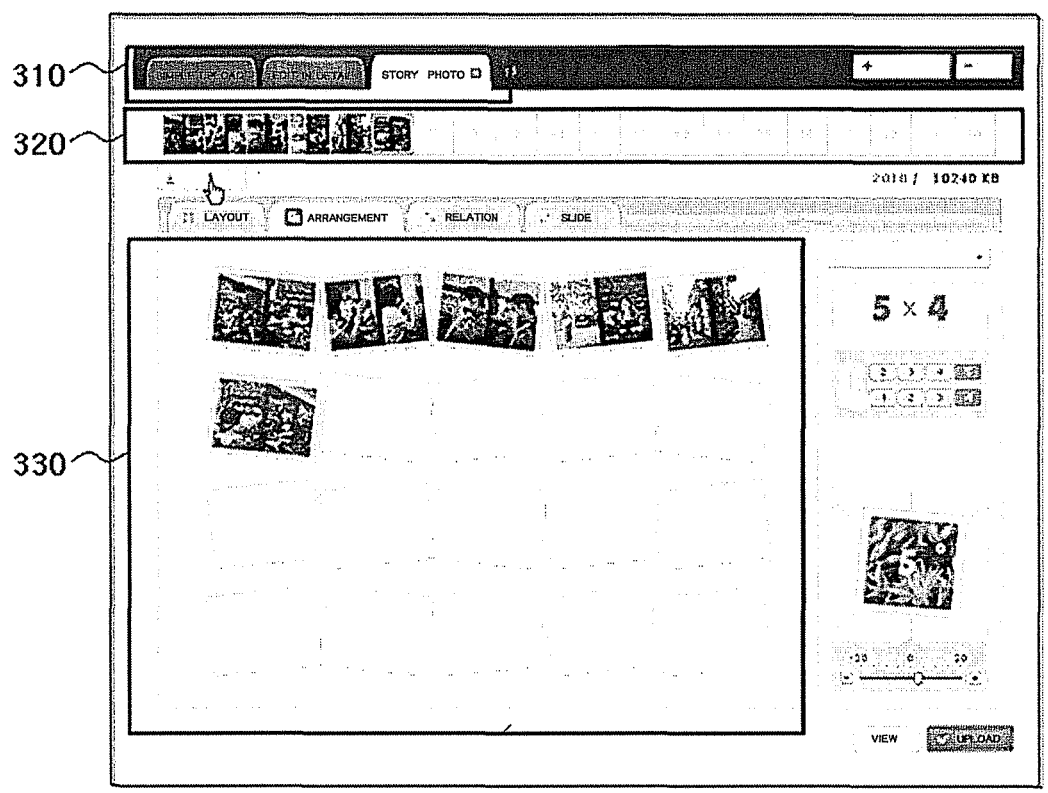

By referring to FIG. 3B, it is found that even though the editing application is changed during the creation of the content, the information on the image is maintained.

Sharing of the Editing Information Among the Editing Applications

Even though the image added by the user are shared among the editing applications, if the editing operations applied to the image by the user are not shared, the user should repeat the editing operations and this would give inconvenience to the user.

Hereinafter, we will first describe the driving methods of the terminal 100 and the service server 200 during the edition of the image in accordance with the present invention and then the configuration of the system for sharing the editing information among the editing applications.

With editing tools provided by each editing application, the user can edit the image in various ways. When the user edits the image, the editing operations are immediately applied to the image and then the modified images are displayed on a screen of the terminal 100.

However, in accordance with the present invention, it does not mean that the editing operations are always applied to the image themselves stored in the service server 200 whenever the editing operations are applied to the image and the modified image are displayed on the screen of the terminal 100. In detail, when the user performs the editing operations including, e.g., rotation, enlargement etc. to the image, the editing operations are immediately applied to the user interface displayed on the screen of the terminal 100 but not to the image themselves in the service server 200. That is, it means that the rotation or the enlargement of the image stored in the service server 200 can be conducted later or the function for rotating or enlarging the image can be stored later in the service server 200 while being kept the image stored in the service server 200 to the original state by interlocking the function with the image.

With respect to the time for reflecting the user's editing operation to the service server 200, a variety of cases may be assumed:

First of all, whenever the user performs the editing operation to the image, the modified image by the editing operation is displayed on a screen of the terminal 100 and at the same time the editing operation is applied to the image themselves stored in the service server 200. In this case, it has the following advantages: the synchronization between the image displayed on the terminal 100 and those stored in the service server 200 is immediately performed whenever each editing operation is applied and thus it is easy to implement the system. In contrast, it has a weakness in that it increases the network load due to frequent network communications between the terminal 100 and the service server 200 and it increases the burden of the service server 200 due to frequent conversions of the image at the service server 200 in light of the fact that the image is modified by using a variety of functions, i.e., the enlargement, the adjustment of the brightness, the "undo" function for canceling the editing operations may be required frequently while creating the content.

Second, it can be imagined that an editing list (i.e., information on the modification of the image by using the editing applications) is transmitted to the service server 200 at the time when the creation of the content is finished. Of course, as explained in the first case, the editing list can be immediately applied to the image which are displayed on the terminal 100 (This can be implemented by using the programming method such as Flash programming and/or AJAX programming capable of easily controlling the screen of the terminal 100 without having to install a separate program in the terminal 100 but it never excludes the implementation by Active X.). However, contrary to the first case, this case has a strength to reduce the load of the network and lessen the burden of the service server 200 but it has a drawback in that the burden of the terminal may be increased and it would be difficult to implement the system because the huge volume of information must be kept until the user finishes modifying the digital content in case a plurality of image are included in the content and each of the image is modified in various ways.

Third, it is assumed that the editing list associated with the image is transmitted to the service server 200 at a certain time while the user modifies the content. For example, the editing list is transmitted to the service server 200 regularly or irregularly, or particularly whenever a certain event such as the conversion of the editing application occurs. According to the third case, the strength and the weakness of the first and the second case may be appropriately complemented.

Hereinafter, the present invention is described based on the case in which the editing list is directly applied to the image in the service server 200 whenever the editing application is converted. It should be noted that the present invention does not exclude the cases in which the editing list is applied to the function interlocked with the image instead of being directly applied to the image included in the service server 200.

When the user modifies the image by using the editing application, the editing list is transmitted to the service server 200 and the image data converting part 222 converts the image stored in the service server 200 on the basis of the editing list. Herein, the editing list is not applied to the image in real time but the modified image (so called, temporary data) is stored temporarily in the service server 200, and at the time when the editing application is converted or the creation of the content is finished, the image stored in the service server 200 are replaced with the temporary data. Accordingly, the stability on the original image would be secured.

Below, explained is a method for sharing the editing information among the editing applications based on the various cases in which the editing operations are performed to the image as mentioned above.

For this purpose, at least part of memory (or memories) in the terminal 100 and/or the service server 200 is set as a storage section to which the multiple editing applications can access and through which the editing information can be shared. This is illustrated in FIG. 4.

Figure 4:
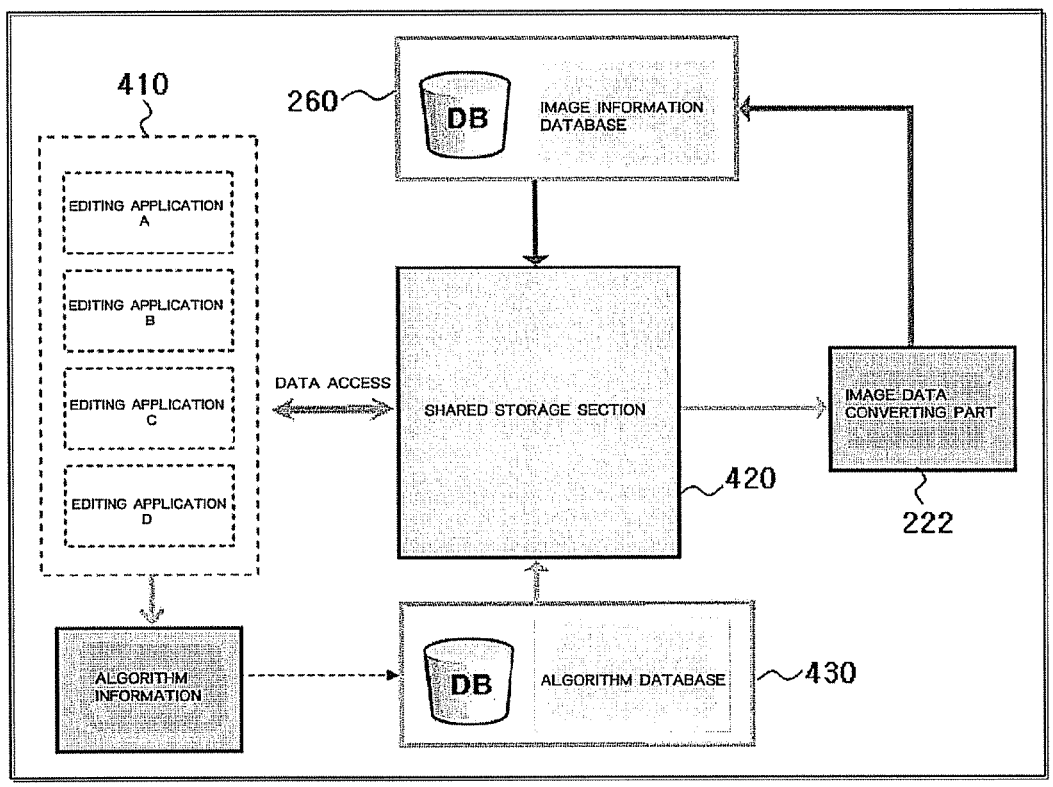
FIG. 4 is a configuration for sharing editing information among the multiple editing applications in accordance with the present invention.

FIG. 4 shows the configuration of the system for sharing the editing information among the multiple editing applications to thereby speed up the processes for modifying or creating the content in accordance with the present invention.

By referring to FIG. 4, the system includes multiple editing applications 410, a storage section 420, an algorithm database 430, the image data converting part 222 and the image information database 260.

Herein, as mentioned above, the editing applications 410 are applications for creating or modifying a variety of contents by using the image to be included therein.

In addition, the storage section 420 is a section for storing the information on the image to be edited by using the editing applications 410, and it is implemented by using, e.g., a shared memory or a database.

However, supposing that the multiple editing applications 410 are not used at the same time and there exists somewhat a small amount of the editing information to be stored, the storage section 420 can be implemented by a simpler method. In detail, it can be implemented by using the hidden frame provided by the HTML. Namely, the editing information would be shared among the editing applications through the procedure for creating a hidden frame which is not exposed to the screen on which the user edits the image and accessing to the hidden frame to read/write data by each of the editing applications.

The algorithm database 430 includes algorithms on several functions which can be carried out by the editing applications 410. When information on which editing operation (and which editing application) was selected by the user is checked, the editing operation is carried out on the image by referring to the corresponding algorithm among the various algorithms in the algorithm database 430.

In concrete, since each of the editing applications 410 offers different editing functions, information on a conversion process such as an algorithm or a conversion matrix which is used when the editing operations are applied by a different editing application 410 can be required in order to make reference to the editing operations performed by the different editing application 410 or display them on the terminal 100. Herein, the information on the conversion process is stored in the algorithm database 430. In other words, the editing applications 410 obtain the conversion process from the algorithm database 430 to display the data on the screen of the terminal 100 by referring to the editing information stored in the storage section 420.

The algorithm database 430 may be expanded in a broader sense, and this will be explained at the part "Cancellation of the Editing operation".

In the meantime, when the user converts the editing application or finishes creating the content, the image in the course of the edition stored in the storage section 420 is recorded in the image information database 260 by the image data converting part 222.

In detail, when the user converts the editing application or finishes creating the content, the editing information stored in the storage section 420 is transferred to the image data converting part 222 and the image data converting part 222 transforms the image stored in the image information database 260 by referring to the editing information. Just as the editing applications 410, the image data converting part 222 refers to the algorithm database 430 during the above-mentioned process. Herein, the existing image stored in the image information database 260 is replaced with the converted image.

In addition, if the user wants to modify the same image later again, the information associated with the image recorded in the image information database 260 might be brought to the storage section 420 and then the image brought to the storage section 420 can be edited in the above-mentioned way.

Figure 5:
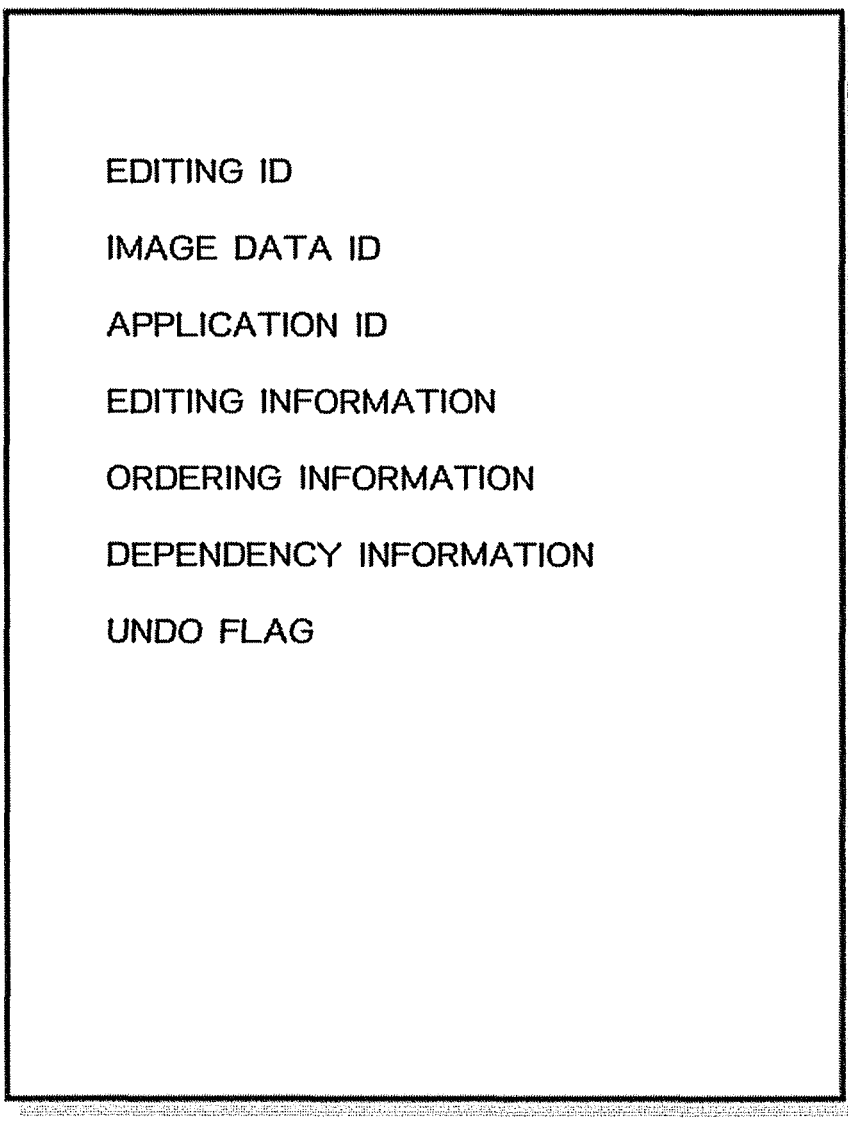
FIG. 5 illustrates information which may be included in a storage section in accordance with the present invention.

FIG. 5 exemplarily illustrates a variety of editing information included in the storage section 420.

First, "Editing ID" is the unique ID for identifying each editing information.

"Image ID" is the information capable of identifying the image to which each editing operation is applied.

"Application ID" is the information capable of identifying each of the editing applications 410 for carrying out the editing operations.

"Editing information" includes information on the editing operations carried out by the user. For example, the information on which editing operation is performed, e.g., the rotation, the enlargement etc. and the information on how much rotated or enlarged through the editing operation is recorded. Furthermore, if multiple editing operations are carried out at the same time (for example, if the user enlarges and at the same time rotates the image through mouse tweaks), "editing information" is expressed in a form of vector including the information on the multiple editing operations.

"Ordering information" includes the information on the order the multiple editing operations are applied. This is recorded in a form of number or a form of pointer which indicates previous or following tasks.

"Dependency information" shows the information on the applied editing operations. For example, when the user adds a star-shaped image to the image and then enlarges the added star-shaped image, the addition and the enlargement of the star-shaped image are dependent on each other. When a specific editing operation is cancelled later, the "Dependency information" is referred to automatically cancel the dependent editing operations which follow the specific editing operation. This will be described later at the part "Cancellation of the Editing operation".

"Undo flag" shows information on whether the conducted editing operation was cancelled by the user or not.

As such, the conducted editing operations can be shared among the editing applications 410 by storing the editing operations in the storage section 420.

"Cancellation of the Editing Operation"

Figure 6A:
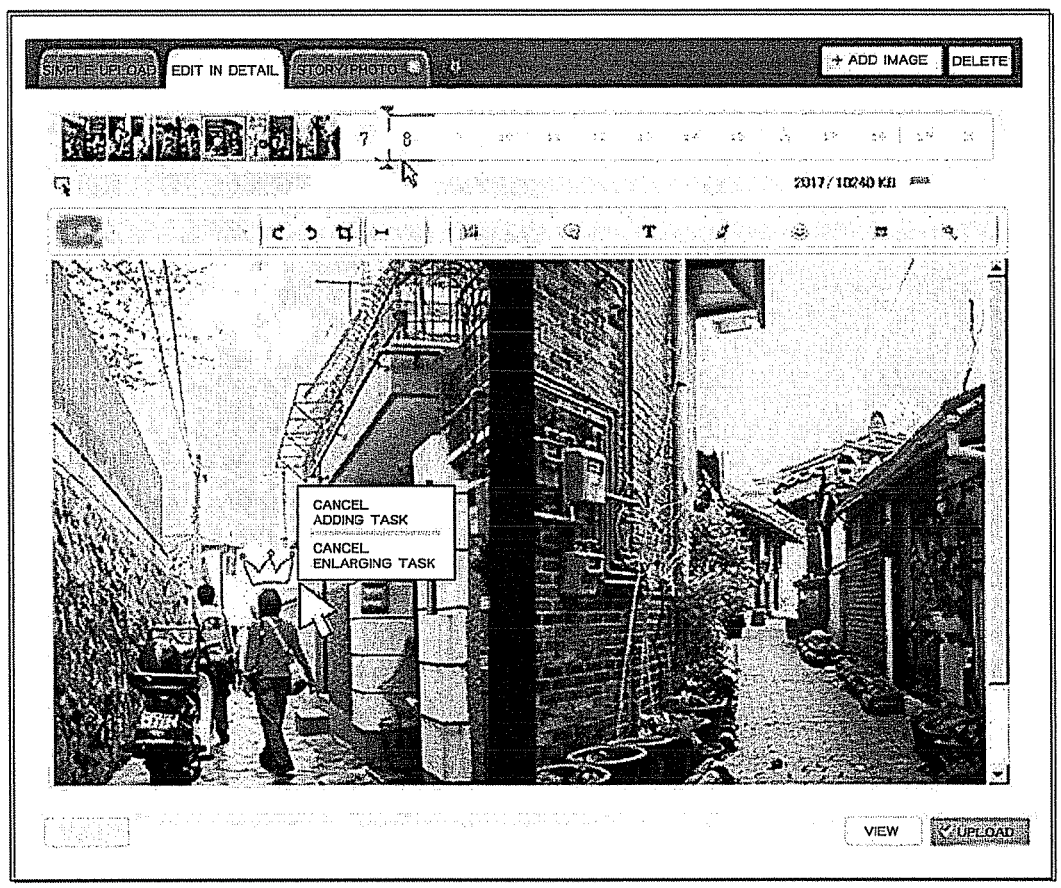
FIG. 6A and FIG. 6B show a user interface to cancel the editing operations in accordance with the present invention.
Figure 6B:
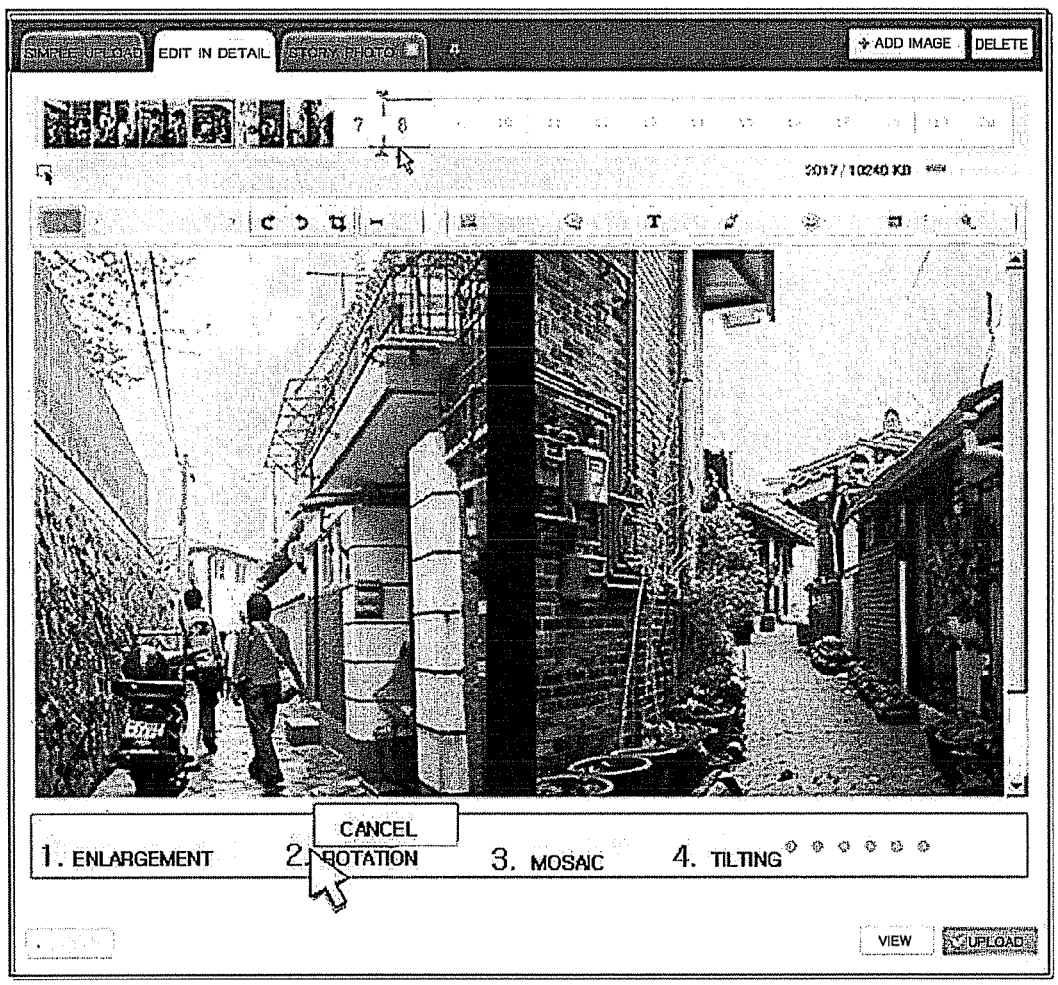

In accordance with the present invention, a specific editing operation which is selected by the user among the editing operations can be cancelled. FIGS. 6A and 6B illustrate exemplary user interface for providing the "undo" function.

By referring to FIG. 6A, the user can obtain the information on an editing operation by designating an edited part with a pointing device such as a mouse or other similar ones and the user interface with which the user selects a specific edited part to cancel the specific editing operation is provided. To this end, when the information on the editing operation is recorded in the storage section 420, the editing operation is recorded with the information on the spatial section at which the editing operation is applied on the screen of the terminal 100.

Furthermore, by referring to FIG. 6B, the information on all the conducted editing operations is displayed on one side of the screen of the terminal 100 serially and the user interface with which the user can cancel the selected editing operation is provided.

When the user designates the specific editing operation, e.g., "rotation", to cancel it, the editing application 410 sets an undo flag of the specific editing operation in the storage section 420. At the time, it is desirable to set other undo flags associated with other editing operations which have dependency on the specific editing operation by referring to the dependency information.

To reflect the information on the cancellation, the editing application 410 refers to the information recorded in the storage section 420 to thereby reorganize the image to be displayed on the screen of the terminal 100. At the time, the editing application 410 obtains the conversion process responding to the reverse conversion of a certain editing operation to be cancelled from the algorithm database 430 and apply it to the present state. More desirably, it is possible to calculate a variety of composite conversion processes associated with the remaining editing operations except the task to be cancelled and apply the calculated composite conversion processes to the image.

As an example for canceling a certain editing operation, this system gets the composite conversion process about a series of editing operations following the certain editing operation and then apply the reverse conversion of the composite conversion process to the image. Thereafter, the system cancels the certain editing operation and then apply the composite conversion process to the image.

To this end, the algorithm database 430 includes a conversion process of each editing operation and/or a variety of combination selected and calculated among the conversion processes and the reverse conversion thereof. In addition, it is possible to refer to information on the editing operations conducted by the user, classify the conducted editing operations into several groups and then create the composite conversion process for each group.

As such, the effects to reduce computation and prevent the waste of databases can be achieved by applying the composite conversion processes associated with the whole or a part of the remaining editing operations except the task to be cancelled to the data image.

Expansion of the Concept of the Editing Application

In accordance with the present invention, the editing applications are not limited to editing tools provided by one service provider. That is, it means that the editing applications in the present invention may be provided by multiple service providers.

By expanding the concept of the present invention as mentioned above, many web services can share the editing information on the image and the user can be free from inconvenience under which the user repeatedly edits the image on the multiple web services.

In the case, the storage section and the algorithm database have more expanded structure physically and logically. On one hand, there may be a case that the shared database is accessible at the same time from the multiple web services. On the other hand, there may be another case which could be implemented in a logical concept through the data exchange of editing information and algorithm by the network communications.

In accordance with the present invention, for the reason that the image added by the user are preserved without losses under various editing applications, such various editing applications may be used conveniently during the procedure for creating one content.

In addition, the present invention allows one application to directly access to the editing operations conducted by another application to thereby enable the user to modify the corresponding tasks and create more various contents through the effective management of the conducted editing operations for the image.

Besides, in accordance with the present invention, when the user desires to cancel a certain editing operation among a variety of editing operations for the image, the system computes the composite conversion process for a series of editing operations following the certain editing operation, and then applies the reverse conversion of the composite conversion process to the image, and then the system cancels the certain editing operation and apply the composite conversion process to the image. This brings the effects to reduce the computation quantity and prevent the waste of the databases etc.

The embodiments of the present invention can be implemented in a form of executable program command through a variety of computer means recordable to computer readable media. The computer readable media includes solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floppy disk and hardware devices such as ROM, RAM and flash memory specially designed to store and perform programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Thus, there has been shown and described several embodiments of a product merchandising system for use in association with walk-in type coolers and with other existing product merchandising areas, which system fulfills all of the objects and advantages sought therefore. Many changes, modifications, variations and other uses and applications of the present constructions will, however, become apparent to those skilled in the art after considering this specification and the accompanying drawings. All such changes, modifications, variations and other uses and applications which do not depart from the spirit and scope of the present invention are deemed to be covered by the invention which is limited only by the claims which follow.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

What is claimed:

1. A method comprising: providing a plurality of editing applications comprising a first editing application and a second editing application to a user terminal over a network, each of the first editing application and the second editing application are provided by different service providers as separate editing applications that are configured to modify an image, wherein an image data list displaying area, including a series of images in thumbnail form, created by the first editing application is maintained on the user interface of the second editing application and the image data list displaying area created by the first editing application is applied to a content creating process displaying area of the second editing application in accordance with an editing function of the second editing application;

in response to receiving a request for editing the image by using the second editing application during performing editing operation by using the first editing application, editing information corresponding to the first editing application in a shared storage section being converted and stored into a non-transitory storage medium, and the second editing application is applied to modify the image based on the editing information by the first editing application, wherein the editing information corresponding to the first editing application is stored to be shared by the second editing application by using a hidden frame provided by the HTML; and providing a user interface configured to display a whole or a part of the editing information associated with the first editing application while performing to edit the image by using the second application, wherein the editing information applied by the first editing application is shared by using the hidden frame, wherein identification information is provided to identify each of the editing information applied by the respective separate editing applications corresponding to an image during the performing editing operation, and dependency information is provided to specify series editing operations applied to the image, each of the series editing operations is dependent on each other associated with the performing editing operation.

2. The method of claim 1, wherein the user interface is configured to select at least one or more editing applications among the plurality of the separate applications and to display the one or more selected editing applications.

3. The method of claim 1, further comprising:
providing at least a portion of the image information edited by using the first editing application in response to detection of the editing application being converted into the second editing application.

4. The method of claim 3, further comprising:
storing an editing list in the non-transitory storage medium, the editing list embodying the at least one editing operation; and
applying at least a portion of the stored editing list to the image to modify the image such that a user can apply previous editing operations embodied in the stored editing list to the image in response to detection of editing the image by using the second editing application.

5. The method of claim 4, further comprising:
providing an editing option to access the stored editing list for the first editing application while the second editing application is being used.

6. The method of claim 4, wherein the editing list is stored in a remote server over the network.

7. The method of claim 4, wherein the editing list is stored in the user terminal.

8. The method of claim 1, wherein the hidden frame is created by the HTML element, wherein the editing information is shared among the respective of the separate editing applications through the procedure for creating the hidden frame which is not exposed to the user terminal.

9. The method of claim 1, wherein the identification information comprises at least one of
identification information on the editing operation for identifying each editing operation; identification information on the image for identifying the edited image,
identification information on the plurality of editing applications for identifying the editing applications by which the editing operations are carried out, or
identification information on the editing operation which includes the types of the editing operations performed to the image.

10. The method of claim 1, further comprising: providing an editing list to cancel at least one editing operation.

11. The method of claim 1, wherein the dependency information comprises an undo flag, the undo flag being indicative of whether the editing operation is cancelled or not.

12. The method of claim 11, wherein, in response to detection of the editing operation being cancelled, other editing operations depending on the cancelled editing operation are also cancelled by referring to the dependency information.

13. The method of claim 12, wherein the editing operation which the user intends to cancel is specified with a pointing device.

14. The method of claim 13, wherein the editing operation which the user intends to cancel is specified by selecting a section where the editing operation has been performed among all the sections of the image displayed on the user terminal with the pointing device.

15. The method of claim 13, wherein the editing operation which the user intends to cancel is specified by selecting some of the lists among a series of lists, displayed on the user terminal, including the editing operations being conducted by the user with the pointing device.

16. The method of claim 13, wherein, in response to detection of the editing operation being cancelled is specified, the editing operation is cancelled by referring to a composite conversion which is calculated by combining a series of editing operations following the editing operation to be cancelled.

17. The method of claim 16, wherein the reverse of the composite conversion is applied to the image, wherein the editing operation is cancelled and the composite conversion is reapplied to the image subsequent to the editing operation being canceled.

18. The method of claim 4, wherein applying at least a portion of the stored editing list to the image to modify the image is performed at least one of the points of time at which the editing application is converted and at which the editing operations are completed.

19. A system for editing image comprising:
a non-transitory storage medium configured to store at least one image;
an editing function providing part, executed by a processor, configured to provide a plurality of editing applications to a user terminal over a network, each of the plurality of editing applications being separate editing applications configured to modify an image, the editing applications comprising a first editing application and a second editing application, wherein the first and second editing applications are provided by different service providers, wherein an image data list displaying area, including a series of images in thumbnail form, created by the first editing application is maintained on the user interface of the second editing application and the image data list displaying area created by the first editing application is applied to a content creating process displaying area of the second editing application in accordance with an editing function of the second editing application;
in response to receiving a request for editing the image by using the second editing application during performing editing operation by using the first editing application, editing information corresponding to the first editing application in a shared storage section being converted by the processor and stored into a non-transitory storage medium, and the second editing application is applied to modify the image based on the editing information by the first editing application, wherein the editing information corresponding to the first editing application is stored to be shared by the second editing application by using a hidden frame provided by the HTML; and
an image data converting part, executed by the processor, configured to apply at least one editing list embodying at least one editing operation to the image to modify the image, wherein a user interface configured to display a whole or a part of the editing information associated with the first editing application while performing to edit the image by using the second application, wherein the editing information edited by using the first editing application is shared by referring to the hidden frame, and wherein identification information is provided to identify each of the editing information applied by the plurality of separate editing applications corresponding to an image during the performing editing operation, and dependency information is provided to specify series editing operations applied, each of the series editing operations is dependable on each other associated with the performing editing operation.

20. The system of claim 19, wherein the user interface is configured to display editing application selected among the plurality of separate editing applications associated with the user terminal.

21. The system of claim 20, further comprising:
even if the editing application selected is converted from the first editing application to the second editing application, the image edited in the first editing application is maintained at the second editing application.

22. The system of claim 21, further comprising:
even if the editing application selected is converted from the first editing application to the second editing application, the editing list for the first editing application is maintained at the second editing application.

23. The system of claim 22, further comprising:
an algorithm database is configured to store at least one conversion process performed by the plurality of separate editing applications.

24. The system of claim 23, wherein the algorithm database comprises the conversion process, the reverse conversion of the conversion process, a composite conversion process combining the whole or a part of the conversion process and the reverse conversion of the composite conversion process.

25. One or more non-transitory computer-readable storage media comprising a computer executable program that, when executed by one or more processors, causes the one or more processors to perform:
providing a plurality of editing applications comprising a first editing application and a second editing application to a user terminal over a network, each of the first editing application and the second editing application being separate editing applications configured to modify an image, wherein the first and second editing applications are provided by different service providers, wherein an image data list displaying area, including a series of images in thumbnail form, created by the first editing application is maintained on the user interface of the second editing application and the image data list displaying area created by the first editing application is applied to a content creating process displaying area of the second editing application in accordance with an editing function of the second editing application;

in response to receiving a request for editing the image by using the second editing application during performing editing operation by using the first editing application, editing information corresponding to the first editing application in a shared storage section being converted and stored into a non-transitory storage medium, and the second editing application is applied to modify the image based on the editing information by the first editing application, wherein the editing information corresponding to the first editing application is stored to be shared by each of the separate and standalone editing applications by using a hidden frame provided by the HTML; and providing a user interface configured to display a whole or a part of the editing information associated with the first editing application while performing to edit the image by using the second application, wherein the editing information edited by using the first editing application is shared by using the hidden frame, wherein identification information is provided to identify each of the editing information applied by the plurality of respective separate editing applications corresponding to an image during the performing editing operation, and dependency information is provided to specify series editing operations applied to the image, each of the series editing operations is dependable on each other associated with the performing editing operation.

26. A server comprising:

a processor configured to perform an editing operation of an image associated with a plurality of editing applications, the respective editing applications being separate editing applications, wherein a non-transitory storage medium is configured to store editing lists and a shared memory is configured to share editing information, and in response to detection of changing from a first editing application to a second editing application, wherein the first and second editing applications are provided by different service providers, the processor to convert editing information corresponding to the first editing application and to store the converted editing information into the non-transitory storage medium, wherein the editing information corresponding to the first editing application is stored to be shared by the second editing applications by using a hidden frame provided by the HTML, wherein identification information is provided to identify each of the editing information applied by the respective separate editing applications corresponding to an image during the performing editing operation, and dependency information is provided to specify series editing information applied to the image, each of the series editing operations is dependable on each other associated with the performing editing operation, and wherein an image data list displaying area, including a series of images in thumbnail form, created by the first editing application is maintained on the user interface of the second editing application and the image data list displaying area created by the first editing application is applied to a content creating process displaying area of the second editing application in accordance with an editing function of the second editing application.

* * * * *